US007952069B2

(12) United States Patent
Shiokawa et al.

(10) Patent No.: US 7,952,069 B2
(45) Date of Patent: May 31, 2011

(54) MASS SPECTROMETER AND MASS SPECTROMETRY METHOD

(75) Inventors: Yoshiro Shiokawa, Hachioji (JP); Megumi Nakamura, Tama (JP); Harumi Maruyama, Inagi (JP); Aiko Wada, Inagi (JP)

(73) Assignee: Canon Anelva Corporation, Kawasaki-shi (JP)

( * ) Notice: Subject to any disclaimer, the term of this patent is extended or adjusted under 35 U.S.C. 154(b) by 287 days.

(21) Appl. No.: 12/431,265

(22) Filed: Apr. 28, 2009

(65) Prior Publication Data

US 2009/0272894 A1 Nov. 5, 2009

(30) Foreign Application Priority Data

Apr. 30, 2008 (JP) ................................ 2008-119042

(51) Int. Cl.
*H01J 49/26* (2006.01)
*H01J 49/00* (2006.01)
*G01N 27/02* (2006.01)

(52) U.S. Cl. ........ 250/282; 250/288; 250/281; 250/283; 250/423 R; 313/359.1; 422/63

(58) Field of Classification Search .................. 250/288, 250/282, 281, 283, 423 R; 313/359.1; 422/63
See application file for complete search history.

(56) References Cited

U.S. PATENT DOCUMENTS

| | | | | |
|---|---|---|---|---|
| 5,037,611 | A * | 8/1991 | Ledford, Jr. | 422/63 |
| 6,507,020 | B2 | 1/2003 | Shiokawa et al. | 250/288 |
| 6,800,848 | B2 * | 10/2004 | Shiokawa et al. | 250/282 |
| 7,084,397 | B2 * | 8/2006 | Hirano et al. | 250/288 |
| 7,155,960 | B2 | 1/2007 | Arii et al. | 73/31.05 |
| 7,202,474 | B2 * | 4/2007 | Hirano et al. | 250/288 |
| 2005/0086997 | A1 | 4/2005 | Arii et al. | 73/25.01 |
| 2009/0266981 | A1 | 10/2009 | Shiokawa et al. | 250/282 |
| 2010/0019140 | A1 * | 1/2010 | Amirav et al. | 250/282 |
| 2010/0163723 | A1 * | 7/2010 | Shiokawa et al. | 250/282 |

FOREIGN PATENT DOCUMENTS

| | | |
|---|---|---|
| JP | 57-164460 | 10/1982 |
| JP | 61-200663 | 9/1986 |
| JP | 3-082949 | 4/1991 |
| JP | 4-015555 | 1/1992 |
| JP | 6-11485 | 1/1994 |
| JP | 11-051904 | 2/1999 |
| JP | 2001-174437 | 6/2001 |

(Continued)

OTHER PUBLICATIONS

R.V. Hodges, et al., "Application of Alkali Ions in Chemical Ionization Mass Spectrometry", Analytical Chemistry, vol. 48, No. 6, pp. 825-829, 1976.

(Continued)

*Primary Examiner* — Nikita Wells
(74) *Attorney, Agent, or Firm* — Fitzpatrick, Cella, Harper & Scinto

(57) ABSTRACT

A mass spectrometer includes an ionization chamber, a temperature control unit which controls the temperature in the ionization chamber to vaporize a sample in at least one of solid and liquid state in the ionization chamber, an introduction unit which introduces the sample into the ionization chamber, an ion supply unit which supplies ions to the ionization chamber to ionize, in the ionization chamber, the sample vaporized in the ionization chamber, and a mass analyzer which measures the mass of the molecules of the ionized sample.

13 Claims, 11 Drawing Sheets

FOREIGN PATENT DOCUMENTS

| | | |
|---|---|---|
| JP | 2001-351567 | 12/2001 |
| JP | 2001-351568 | 12/2001 |
| JP | 2002-124208 | 4/2002 |
| JP | 2002-170518 | 6/2002 |
| JP | 2003-130770 | 5/2003 |
| JP | 2005-127931 | 5/2005 |
| JP | 2009-264950 | 11/2009 |

OTHER PUBLICATIONS

Daniel Bombick, et al. "Potassium Ion Chemical Ionization and Other Uses of an Alkali Thermionic Emitter in Mass Spectrometry", Analytical Chemistry, vol. 56, No. 3, pp. 396-402, 1984.

Toshihiro Fujii, et al. "Chemical Ionization Mass Spectrometry with Lithium Ion Attachment to the Molecule", Analytical Chemistry, vol. 61, No. 9, pp. 1026-1029, 1989.

Toshihiro Fujii "A Novel Method for Detection of Radical Species in the Gas Phase: Usage of $Li^+$ Ion Attachment to Chemical Species", Chemical Physics Letters, vol. 191, No. 1.2, pp. 162-168, 1992.

T. Faye, et al. "Sodium Ion Attachment Reactions in an Ion Trap Mass Spectrometer", Rapid Communication in Mass Spectrometry, vol. 14, pp. 1066-1073, 2000.

Saito, N. et al., "Development of a Method for Ion-Attachment Time-of-Flight Mass Spectrometry (IA-TOF-MS)", summaries of lectures in the $15^{th}$ Symposium on Environmental Chemistry of the Japan Society of Environmental Chemistry, Jun. 19, 2006, pp. 262-263.

* cited by examiner

MASS SPECTROMETER AND MASS SPECTROMETRY METHOD

BACKGROUND OF THE INVENTION

1. Field of the Invention

The present invention relates to a mass spectrometer and a mass spectrometry method and, for example, a mass spectrometer and a mass spectrometry method which analyze a sample in at least one of solid and liquid state easy to pyrolytically decompose by ionizing it using an ion attachment method to suppress decomposition.

2. Description of the Related Art

An ion attachment mass spectrometer (IAMS) is an apparatus which attaches ions to target measurement molecules and measures their mass.

Ion attachment mass spectrometers are reported in non-patent references 1, 2, 3, 4, and 5. Related techniques are disclosed in patent references 1, 2, 3, 4, 5, and 6.

FIGS. 9 and 10 show examples of mass spectrometers for analyzing the mass of a solid and/or liquid sample. Both mass spectrometers use an ion attachment method for ionization.

An ionization chamber 100 and a sample vaporization chamber 101 are arranged in a first cell 130. A mass analyzer 108 is arranged in a second cell 140. Vacuum pumps 109 evacuate the first cell 130 and the second cell 140. Hence, all the ionization chamber 100, sample vaporization chamber 101, and mass analyzer 108 are maintained in a low pressure atmosphere having a pressure lower than the atmospheric pressure. An emitter 107 made of a metal oxide and placed in the ionization chamber 100 generates positively charged metal ions such as $Li^+$ when heated.

A sample 105 is held by a sample holder 104 arranged in the sample vaporization chamber 101, and heated by an indirect heater 103. The indirect heater 103 and the sample holder 104 are provided at the distal end of a sample insertion probe 102. The solid and/or liquid sample 105 heated in the sample vaporization chamber 101 vaporizes and turns into neutral gas phase molecules (gas) 106. The neutral gas phase molecules 106 move and enter the ionization chamber 100 by diffusion, gas flow and buoyancy, and the like.

Then, the neutral gas phase molecules 106 are ionized in the ionization chamber 100 to generate ions. The ion attachment method attach metal ions to the portions of the neutral gas phase molecules, that have dielectric polarization. The molecules with the metal ions attached form ions that are positively charged overall. The molecules do not decompose because the energy given to them upon metal ion attachment is very small.

The generated ions are transported from the ionization chamber 100 to the mass analyzer 108 upon receiving a force from an electric field, and analyzed by the mass analyzer 108.

The ion attachment method capable of ionizing original molecules without decomposing them is advantageous because it allows highly accurate, quick, and simple measurement. More specifically, a mass spectrum measured by the ion attachment method has no decomposition peak but only the original molecular peak. In short, a sample containing n kinds of components exhibits n peaks, and the components can be qualitatively and quantitatively measured based on their mass numbers. It is therefore possible to directly measure even a mixed sample containing a plurality of components without component separation.

In techniques other than the ion attachment method, various kinds of decomposition peaks appear in a mass spectrum. It is therefore necessary to separate components using a gas chromatograph (GC) or a liquid chromatograph (LC) before mass analysis. To normally separate the components of many samples by GC/LC, complex and cumbersome preprocessing is required for each sample. Normally, component separation takes several ten minutes, and preprocessing takes several to several ten hours. The ion attachment method requires neither preprocessing nor component separation and can end measurement in only several minutes.

However, in some samples, molecules may decompose (pyrolytically decompose) simultaneously with vaporization. Such a sample cannot generate ions in the original molecular state because of decomposition at the time of vaporization even if decomposition at the time of ionization is suppressed using the ion attachment method.

As a technique of vaporizing a sample easy to pyrolytically decompose without pyrolysis, a rapid heating method is known. This method quickly heats and vaporizes a sample before the start of pyrolysis. However, in the apparatus shown in FIG. 9 called a direct inlet probe (DIP), the indirect heater 103 heats not only the sample 105 but also the sample holder 104 and the sample insertion probe 102 having large heat capacities. Hence, rapid heating is difficult. This method generally takes several minutes to reach the vaporization temperature.

An improved apparatus shown in FIG. 10 called a direct exposure probe (DEP) can perform rapid heating because a direct heater 110 heats only the sample 105. The time to reach the vaporization temperature shortens to several sec. However, many samples still pyrolytically decompose even in this method. Additionally, since the sample vaporization chamber 101 is away from the ionization chamber 100, a sample that has escaped pyrolysis upon vaporization may pyrolytically decompose during movement to the ionization chamber 100.

An apparatus shown in FIG. 11 called a particle beam apparatus is used as an interface to a liquid chromatograph/mass spectrometer (LC/MS) for continuously measuring a solution sample made by dissolving and mixing sample components in a medium (solvent). In the particle beam apparatus, a solution sample 125 is turned into fine particles by a sprayer 124, vaporized (to neutral gas phase molecules) in a heated sample vaporization chamber 123, and introduced into the ionization chamber 100. In the sample vaporization chamber 123, the solvent that impedes measurement is removed and discharged to concentrate the sample. A separator 120 ejects the vaporized gas to the discharge area of an exhaust pipe 121, passes only heavy molecules (sample components), and discharges light molecules (solvent). A heater 122 heats the sample vaporization chamber 123.

However, a component having a high vaporization temperature may enter the ionization chamber 100 in a fine particle state without being vaporized sufficiently. Alternatively, a component easy to coalesce (independent molecules gather to form an aggregate) may form fine particles after vaporization in the sample vaporization chamber 123 and enter the ionization chamber 100.

As the ionization method, electron ionization (EI) is used as a common ionization technique for neutral gas molecules.

Electron spray ionization (ESI) that is the most popular ionization method of LC/MS directly ionizes a solution sample (without vaporizing). This reduces the influence of pyrolysis. Note that both the electron ionization (EI) and the electron spray ionization (ESI) cannot ionize a sample while suppressing decomposition.

GC/LC measurement using these methods not only takes time and labor but also requires an expensive internal standard sample for quantitative measurement. LC measurement requires an internal standard sample because preprocessing and component separation are done in many process steps, and comparison of absolute values is impossible. To the contrary, the ion attachment method that requires neither preprocessing nor component separation can perform quantitative measurement without using an internal standard sample.

It is demanded to quickly, accurately, simply, and inexpensively measure the mass of a solid or liquid sample without decomposing its molecules regardless of components and the presence/absence of a solvent.

[Patent Reference 1] Japanese Patent Laid-Open No. 6-11485

[Patent Reference 2] Japanese Patent Laid-Open No. 2001-174437

[Patent Reference 3] Japanese Patent Laid-Open No. 2001-351567

[Patent Reference 4] Japanese Patent Laid-Open No. 2001-351568

[Patent Reference 5] Japanese Patent Laid-Open No. 2002-124208

[Patent Reference 6] Japanese Patent Laid-Open No. 2002-170518

[Non-Patent Reference 1] Hodges (Analytical Chemistry vol. 48, No. 6, p. 825 (1976))

[Non-Patent Reference 2] Bombick (Analytical Chemistry vol. 56, No. 3, p. 396 (1984))

[Non-Patent Reference 3] Fujii (Analytical Chemistry vol. 61, No. 9, p. 1026 (1989))

[Non-Patent Reference 4] Chemical Physics Letters vol. 191, No. 1.2, p. 162 (1992)

[Non-Patent Reference 5] Rapid Communication in Mass Spectrometry vol. 14, p. 1066 (2000)

SUMMARY OF THE INVENTION

The present invention provides a technique advantageous for analyzing a mass while suppressing decomposition of molecules.

According to the first aspect of the present invention, there is provided a mass spectrometer comprising an ionization chamber, a temperature control unit configured to control a temperature in the ionization chamber to vaporize a sample in at least one of a solid state and a liquid state in the ionization chamber, an introduction unit configured to introduce the sample into the ionization chamber, an ion supply unit configured to supply ions to the ionization chamber to ionize, in the ionization chamber, the sample vaporized in the ionization chamber, and a mass analyzer which measures a mass of molecules of the ionized sample.

According to the second aspect of the present invention, there is provided a mass spectrometry method comprising the steps of controlling a temperature in an ionization chamber to vaporize a sample in at least one of a solid state and a liquid state in the ionization chamber, introducing the sample into the ionization chamber, ionizing, in the ionization chamber, the sample vaporized in the ionization chamber, and measuring a mass of molecules of the ionized sample.

Further features of the present invention will become apparent from the following description of an exemplary embodiment with reference to the attached drawings.

DESCRIPTION OF THE EMBODIMENTS

The embodiments of the present invention will now be described in detail with reference to the accompanying drawings.

First Embodiment

Figure 1:
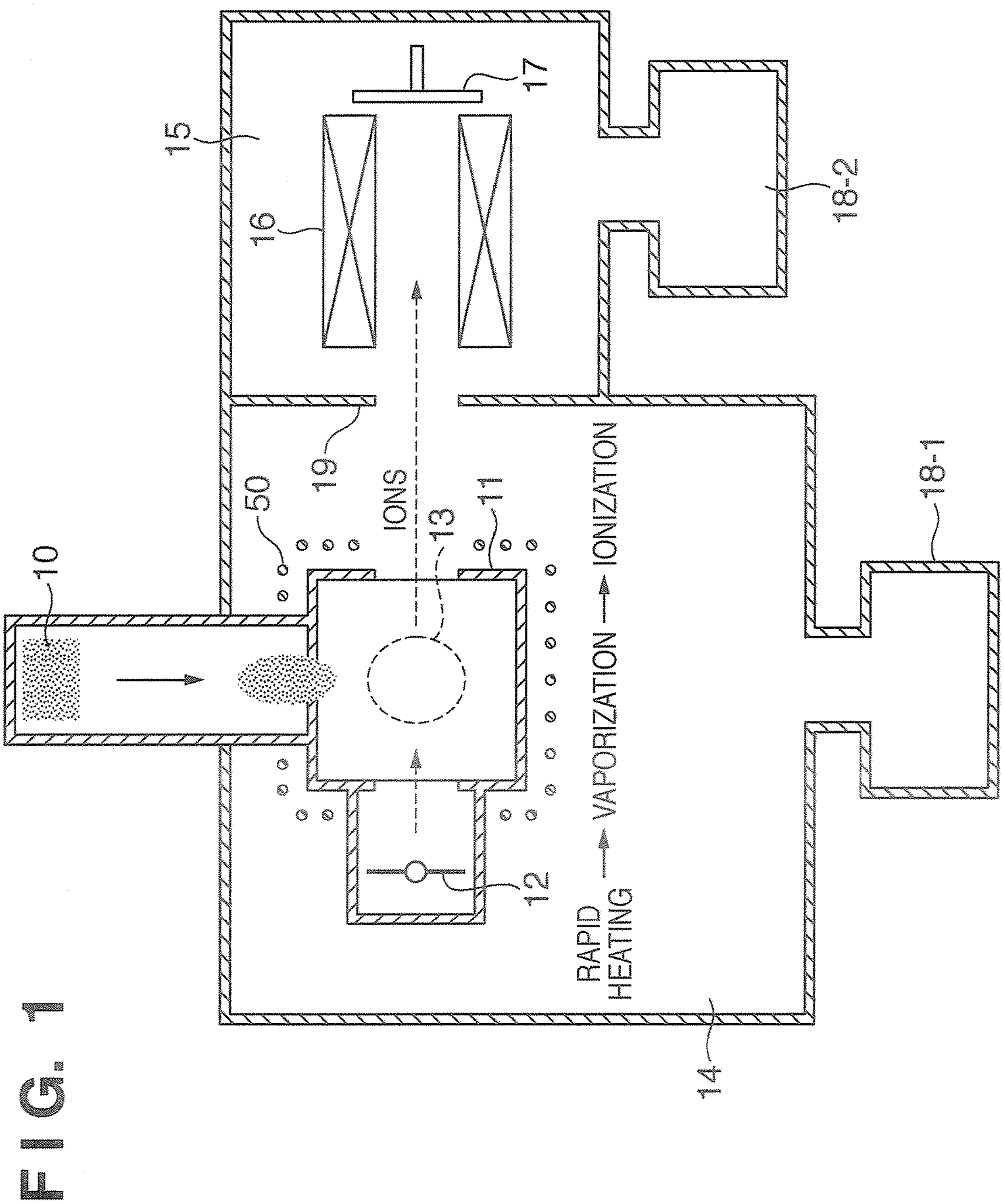
FIG. 1 is a schematic general view of a mass spectrometer according to the first embodiment of the present invention.

FIG. 1 is a general view of a mass spectrometer according to the first embodiment of the present invention. The sample is a solid sample. The solid sample is turned into fine particles using a mortar and a pestle or freeze grinding. A fine particulate solid sample (to be referred to as a fine particulate sample hereinafter) 10 is held by a sample drop mechanism (introduction unit) located above an ionization chamber 11. The fine particulate sample 10 drops from the sample drop mechanism (introduction unit) by gravitation and directly enters the ionization chamber 11. A heater 50 serving as a temperature control unit maintains the ionization chamber 11 at a temperature higher than the vaporization temperature of the fine particulate sample 10. In addition to drop by gravitation, various other methods such as carrier gas flow are usable to transport the fine particulate sample 10.

The temperature of the fine particulate sample 10 rises as it absorbs heat in the ionization chamber 11. At this time, the fine particulate sample 10 is rapidly heated because each particle of it has a small heat capacity. The fine particulate sample 10 is generally supposed to reach the vaporization temperature in time of an mS (millisecond) order, although the time depends on the particle size and temperature. For this reason, even a sample easy to pyrolytically decompose can be vaporized without pyrolysis. The particle size of the fine particulate sample 10 is preferably not less than 1 micrometer and not greater than 10 micrometer. The fine particulate sample 10 vaporizes in a vaporization region 13 that is the space in the ionization chamber 11. In the vaporization region 13, the fine particulate sample 10 is rapidly heated and vaporized into neutral gas molecules. Metal ions emitted from an emitter 12 attach to the neutral gas molecules to ionize them.

The temperature of the fine particulate sample 10 rises up to that in the ionization chamber 11 and then remains constant. Hence, when the temperature in the ionization chamber 11 is set to be slightly higher than the vaporization temperature, no excess heat is applied to the neutral gas molecules so that any thermal alteration such as pyrolysis can be avoided. That is, after rapidly heating to the temperature sufficient for vaporization, the fine particulate sample 10 can be maintained at the temperature free from thermal modification.

Since vaporization of the fine particulate sample 10 occurs in the ionization chamber 11, ions are generated immediately (i.e., in almost the same time and space) at the place where the fine particulate sample 10 has vaporized to the neutral gas molecules. Hence, thermal modification occurs less in terms of time, and loss (adsorption to the walls in the course) is much smaller in terms of space, as compared to the conventional method in which the sample vaporization chamber and the ionization chamber are separate.

The emitter (ion supply unit) 12 supplies positively charged metal ions such as $Li^+$ to the ionization chamber 11. The metal ions attach to the neutral gas molecules to form metal-ion-attached molecules. The metal-ion-attached molecules undergo mass analysis by a mass analyzer 16 and a secondary electron multiplier 17. The ionization chamber 11 and the emitter 12 are arranged in a first cell 14. The mass analyzer 16 is arranged in a second cell 15. Vacuum pumps 18 evacuate the first cell 14 and the second cell 15 to a pressure lower than the atmospheric pressure. The first cell 14 is connected to the second cell 15 via a partition 19 having a hole (aperture).

Figure 2:
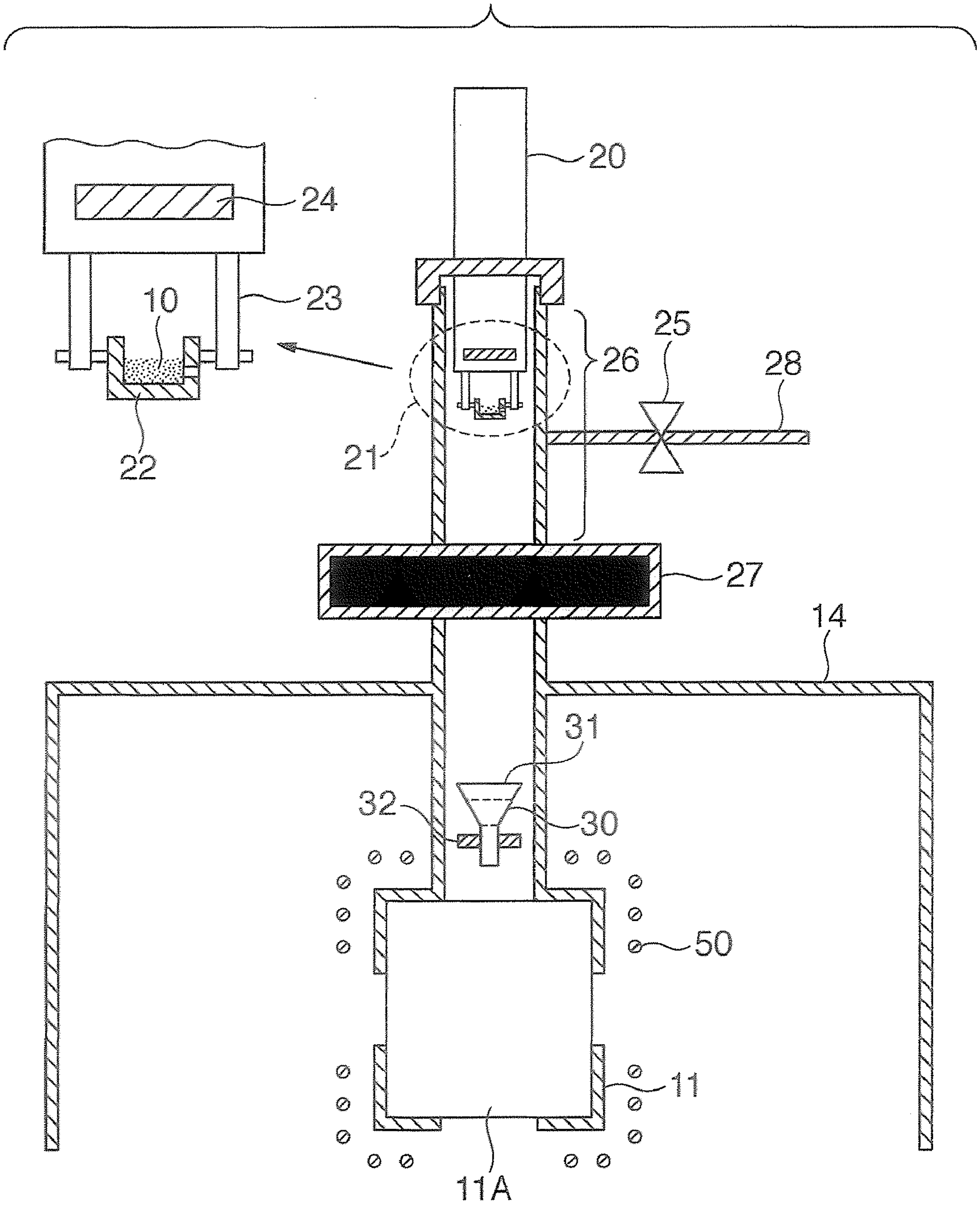
FIG. 2 is a partially enlarged view of an example of the mass spectrometer shown in FIG. 1.
Figure 3:
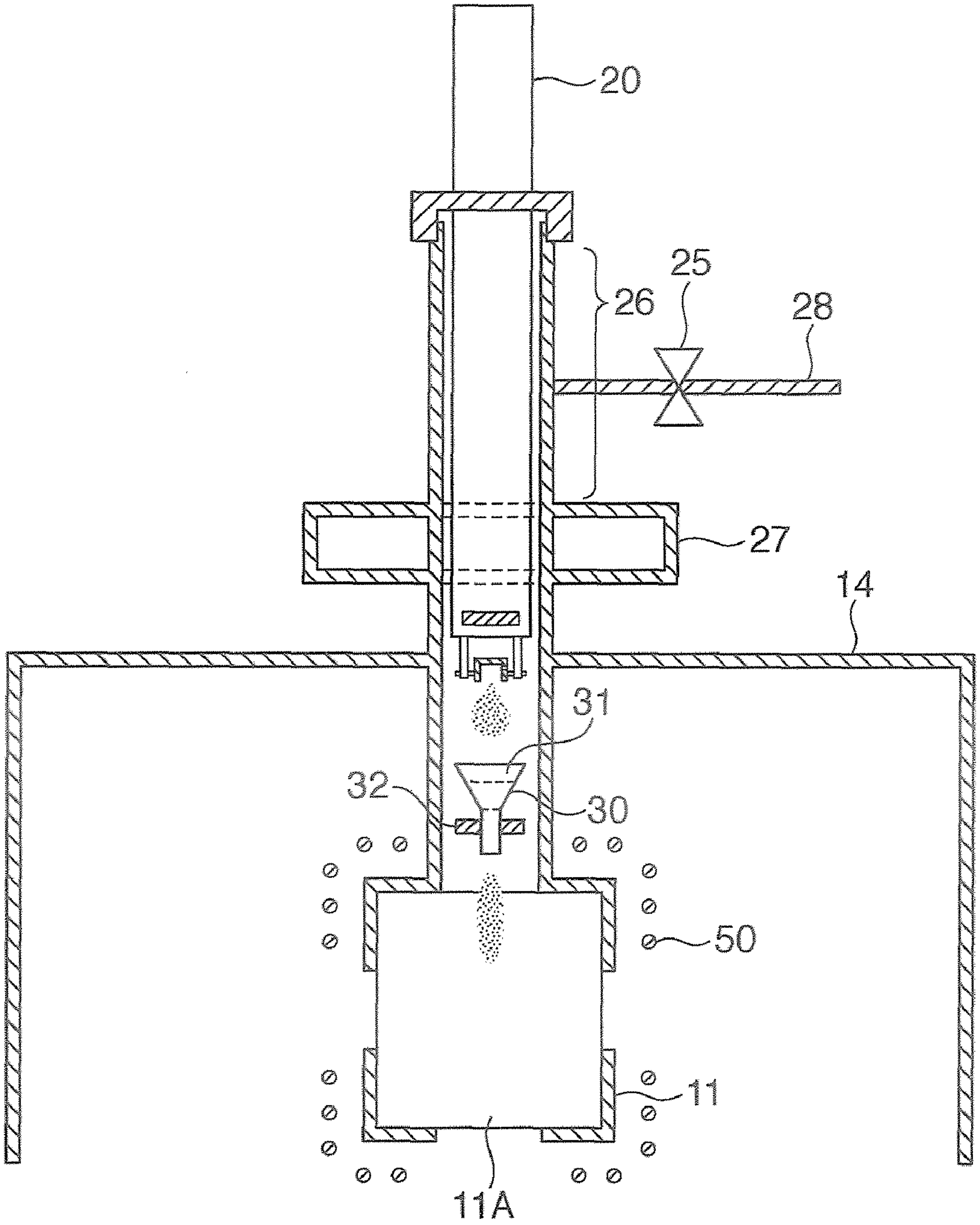
FIG. 3 is a partially enlarged view of an example of the mass spectrometer shown in FIG. 1.

FIGS. 2 and 3 are partially enlarged views of the mass spectrometer shown in FIG. 1. A sample drop mechanism 21 is installed at an end of a sample insertion member 20, and arranged above a load lock chamber 26 and the ionization chamber 11 in the first cell (vacuum chamber) 14. More specifically, as shown in FIG. 2, the sample drop mechanism 21 (and the fine particulate sample held by it) installed at the end of the sample insertion member 20 is inserted into the load lock chamber 26 while keeping a sample valve 27 closed. After that, an exhaust valve 25 opens to evacuate the load lock chamber 26 to a vacuum state via an exhaust pipe 28. Then, the sample valve 27 opens to move the sample drop mechanism 21 installed in the end of the sample insertion member 20 to an operation position above the ionization chamber 11, as shown in FIG. 3.

A sample holder 22 of the sample drop mechanism 21 stores the fine particulate sample 10. When the sample drop mechanism 21 is arranged at the operation position, a rotating mechanism 23 rotates the sample holder 22 and turns it upside down, thereby dropping the fine particulate sample 10. A detailed example of the rotating mechanism 23 is a mechanism which rotates a support rod supporting the sample holder 22 by a rack-and-pinion mechanism. As another detailed example, one end of a wire is attached to the bottom of the rotatably supported sample holder 22, and the other end of the wire is pulled upward.

A funnel 30 is preferably arranged between the sample drop mechanism 21 and the ionization chamber 11. The funnel 30 contributes to introduce the sample 10 to the central region of the ionization chamber 11 where ionization occurs efficiently and accurately. The shape of the funnel 30 is not limited to that shown in FIGS. 2 and 3. It need only have, for example, a hollow conical structure which has an area smaller on the outlet side (ionization chamber 11 side) than on the inlet side (sample drop mechanism 21 side) as a focusing structure to focus the fine particulate sample 10 to the vaporization region of the ionization chamber 11 (preferably, the central region of the ionization chamber 11). That is, the funnel 30 need only have a shape to drop the solid sample to the vaporization region 13 that is the space in the ionization chamber 11. The funnel 30 can have a thin tube at the distal end of the hollow conical structure.

The sample drop mechanism 21 preferably includes a vibrator 24 that vibrates the sample holder 22. The focusing structure also preferably has a vibrator 32 that vibrates the funnel 30. The vibrators 24 and 32 contribute to smooth transportation of the fine particulate sample 10 by preventing it from solidifying or sticking to the surfaces of the sample holder 22 and the funnel 30. A mesh 31 is preferably attached in the funnel 30 to prevent drop of large particles. The ionization chamber 11 has an outlet 11A in the bottom to quickly discharge the unvaporized fine particulate sample 10. This prevents the fine particulate sample 10 from dwelling too long and pyrolytically decomposing in the hot ionization chamber 11. These mechanisms increase the efficiency and accuracy of vaporization and ionization.

To achieve a high measurement accuracy, it is important to instantaneously and uniformly heat the fine particulate sample 10 in the ionization chamber 11, keep the particle size of the fine particulate sample 10 in the tolerance of the optimum particle size, prevent scattering (dispersion) of the fine particulate sample 10 upon dropping, and uniformly supply the fine particulate sample 10 to the vaporization region 13.

Figure 4:
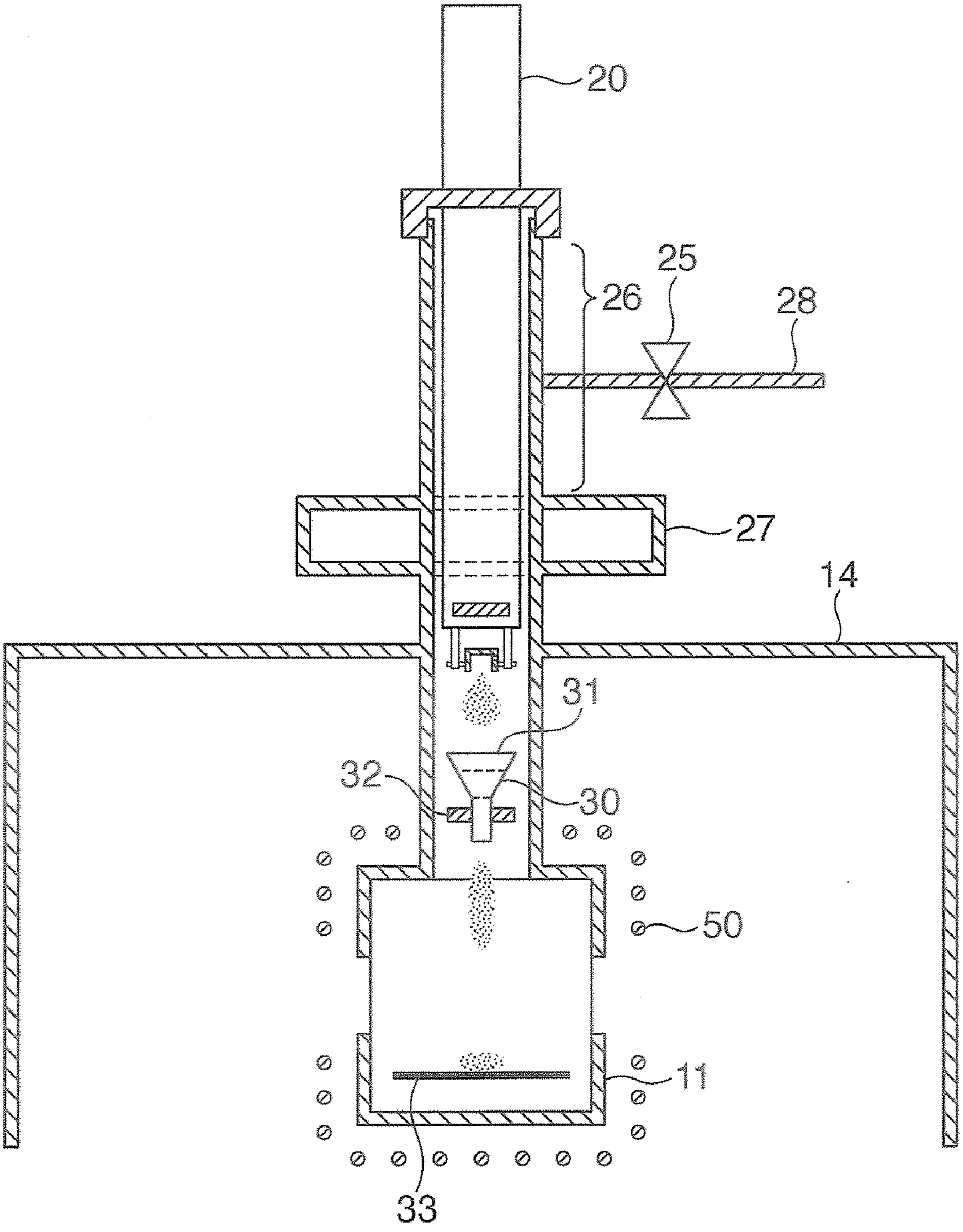
FIG. 4 is a partially enlarged view of another example of the mass spectrometer shown in FIG. 1.

As described above, the fine particulate sample 10 is ideally heated and vaporized in a space in the ionization chamber 11. If the fine particulate sample 10 is made of a substance hard to vaporize, or the particle size cannot be small enough, a heated boat (made of a refractory material) 33 may be installed in the ionization chamber 11 (e.g., near the base), as shown in FIG. 4, so as to drop the fine particulate sample 10 to there for heating and vaporization. The boat 33 is heated by supplying power to it.

The above-described configuration to supply the fine particulate sample 10 to the ionization chamber 11 by drop contributes to simplify the apparatus. The fine particulate sample 10 may be injected into the ionization chamber 11 by gas flow. In this case, it is possible to eliminate the limitation on the supply direction of the fine particulate sample 10, and control the dwell time in the ionization chamber 11.

Figure 11:
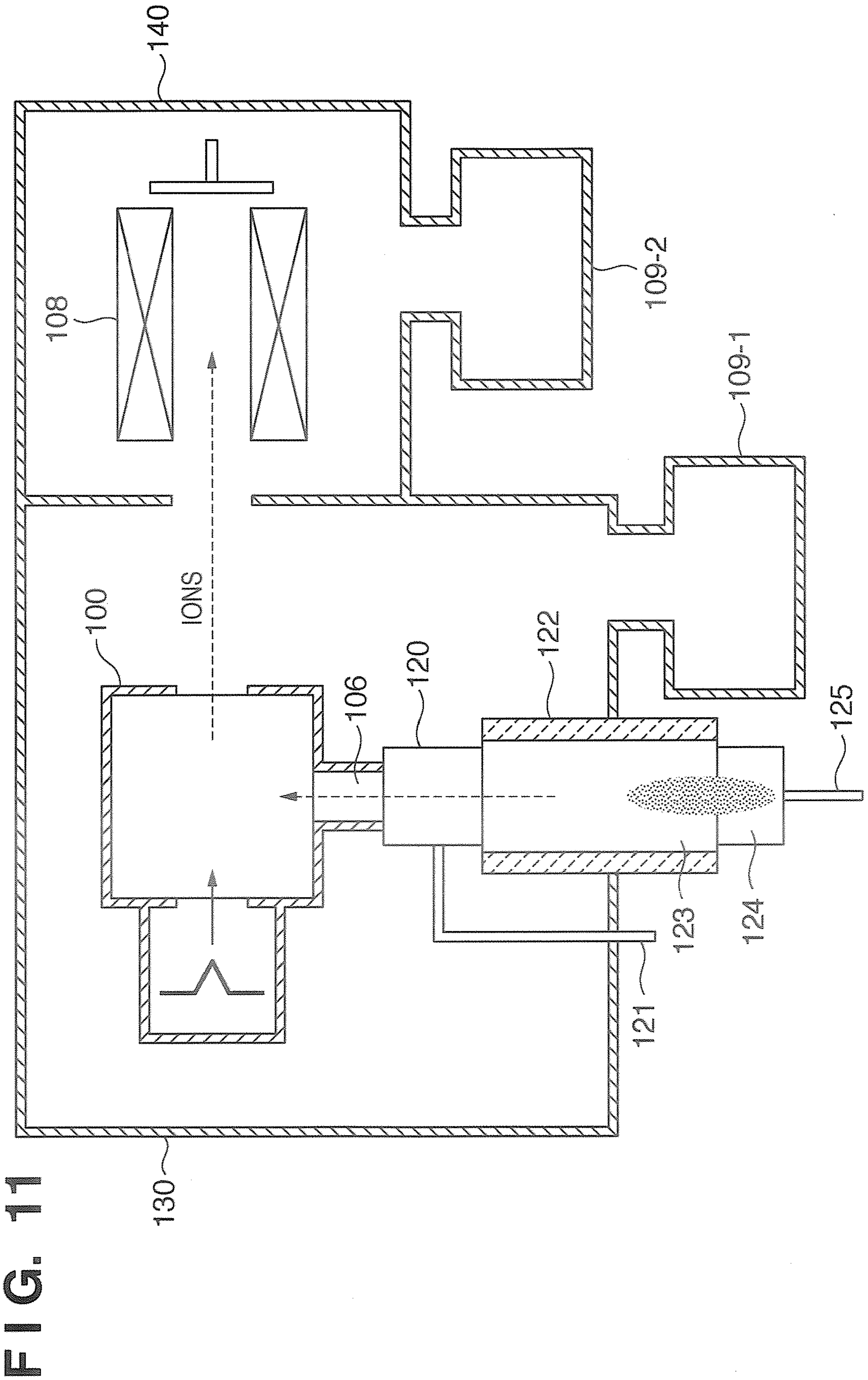
FIG. 11 is a view showing still another example of the arrangement of the mass spectrometer for a solid or liquid sample.

The ion attachment method of this embodiment may be combined with the particle beam apparatus shown in FIG. 11. In this case, a solution sample containing a solvent is used. A sample that has vaporized into fine particles in the sample vaporization chamber, and a sample that has not sufficiently vaporized in the sample vaporization chamber are introduced into and vaporized in the ionization chamber 11 maintained by the heater 50 at a temperature higher than the vaporization temperature of the sample.

In the conventional particle beam apparatus, a component having a high vaporization temperature may enter the ionization chamber in a fine particle state without being vaporized sufficiently, or while forming fine particles after vaporizing a component easy to coalesce. In this embodiment, it is possible to ionize even such a sample while suppressing decomposition in both vaporization and ionization.

Second Embodiment

Figure 5:
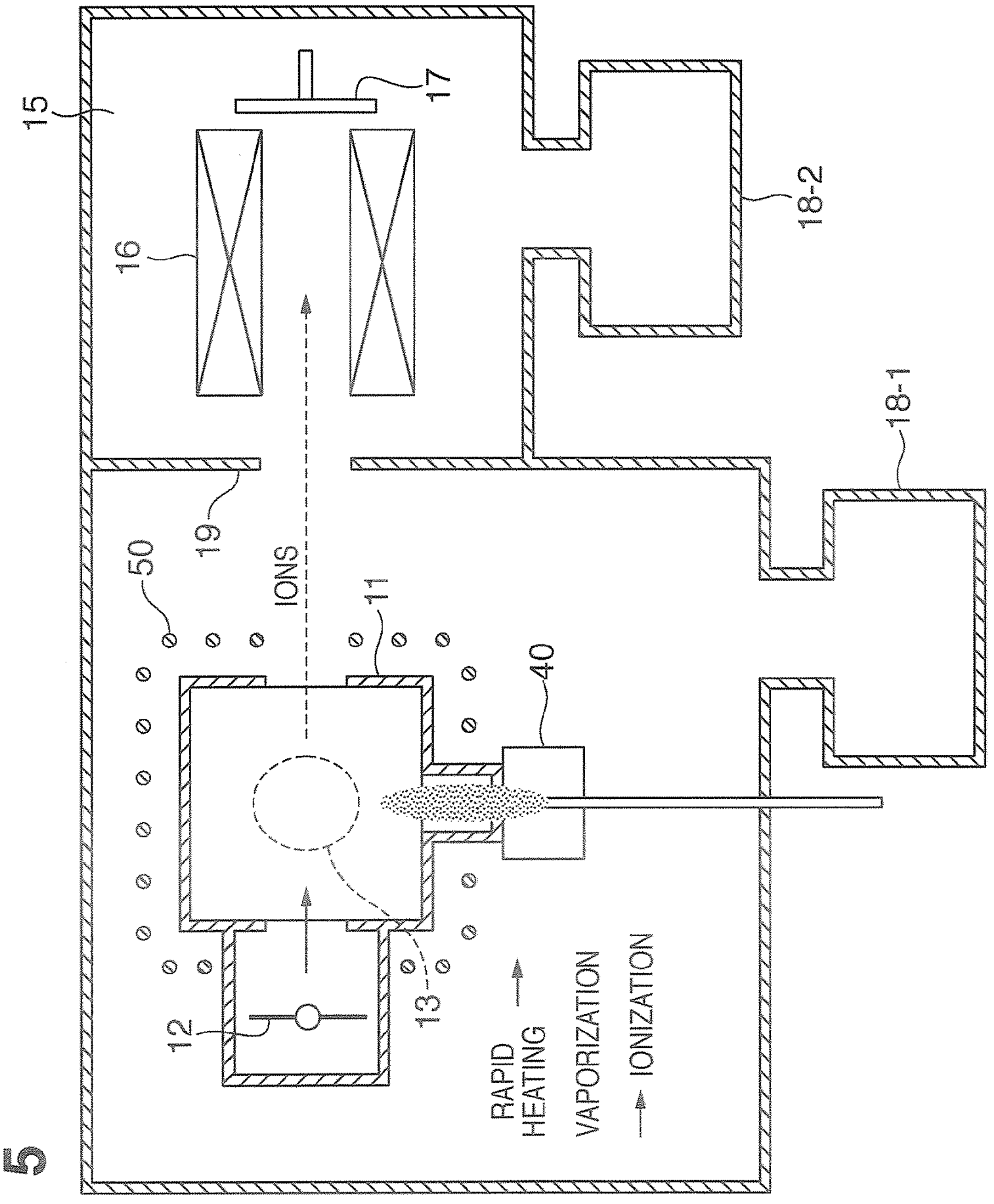
FIG. 5 is a schematic general view of a mass spectrometer according to the second embodiment of the present invention.

FIG. 5 is a view showing the schematic arrangement of a mass spectrometer according to the second embodiment of the present invention. The sample is a liquid sample (containing no solvent). The liquid sample is turned into fine particles in a spray chamber 40 and directly introduced into an ionization chamber 11 by a spray force (a force to advance the fine particles which receive a high pressure for mist generation). A heater 50 maintains the ionization chamber 11 at a temperature higher than the vaporization temperature of the sample. The sample vaporizes in a vaporization region 13 in the ionization chamber 11. Note that the sample may be transported by carrier gas flow or drop by gravitation except the spray force. The mass spectrometer has the same overall arrangement as that for a solid sample shown in FIG. 1 except fine particle formation in the spray chamber 40.

Third Embodiment

Figure 6:
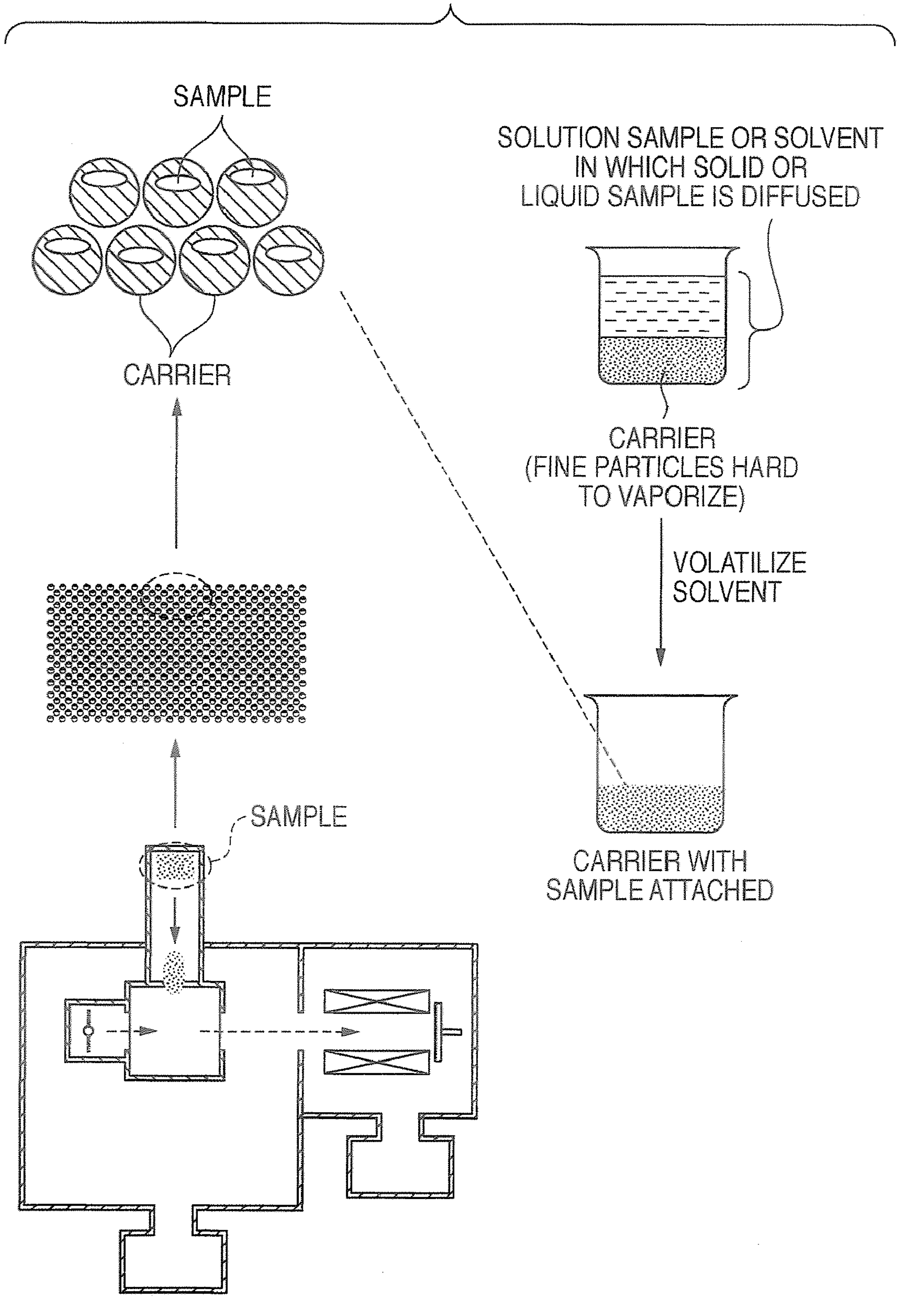
FIG. 6 is an explanatory view showing a mass spectrometry method according to the third embodiment of the present invention.

FIG. 6 shows a process according to the third embodiment of the present invention. The sample is a solid or liquid sample or a solution sample (containing a solvent). A solution sample is used directly. For a solid or liquid sample, a solvent to diffuse the sample is prepared. For quantitative measurement, the sample and the solvent are weighed, and dispensed as needed.

Next, a particulate carrier is used. A carrier is used to attach and immobilize a sample to its surface so as to reliably, accurately, and easily introduce the sample into an ionization chamber.

As shown in FIG. 6, a carrier is put into a beaker filled with a solution sample, or a solvent in which a solid or liquid sample is diffused, thereby attaching the sample to the surface of the carrier. Then, the solvent is volatilized to immobilize the sample on the surface of the carrier. After that, the carrier is used in place of the sample of the first embodiment (FIG. 1 and FIGS. 2 and 3, or FIG. 4).

The carrier can be made of any material if it can form fine particles hard to vaporize. More preferably, the carrier is easy to uniformly attach the sample to its surface and hard to react with the sample and thermally modify, and has a uniform particle size and a small heat capacity. A solid or liquid sample is sometimes hard to form fine particles or ensure a uniform particle size of itself. The carrier solves this problem. The carrier can effectively be used even when the sample is too light or easy to stick. It is often difficult to weigh a sample for quantitative measurement because the amount of the sample to be inserted is too small. However, this problem can be solved by dispensing the sample using a solvent.

One prerequisite is that the inner surface area of the beaker is smaller than the total surface area of the fine particles. This is because the accuracy and sensitivity largely decrease if the sample attaches not to the carrier but to the vessel. However, a vessel having a surface much more smooth and inert than the carrier can prevent the problem even if the surface area is large. Detailed examples of the carrier are generally silicon-based glass powder, $SiO_2$, diatomaceous earth, and sea sand. Carbon-based fullerene, carbon nanotube, and adsorptive charcoal are also usable. When thermal modification is taken into consideration, inorganic salts (e.g., magnesium sulfate, sodium sulfate, sodium carbonate, and sodium chloride) are preferable.

Sample preprocessing such as component extraction (only a specific component of the sample is extracted) and fractionation (the sample components are separated) can also be performed using the difference in surface properties between carriers. More specifically, when a carrier having an adsorption property to only a specific component is used, only the specific component attaches to the carrier surface at a high concentration, and the remaining components remain in the liquid. Extraction is thus performed. When carriers having different adsorption properties are used in a plurality of processes, and different components are extracted from a single sample in the respective processes, fractionation can be performed.

Note that an adsorptive carrier may react with a sample at the time of heating and vaporization. To prevent this, a component temporarily immobilized to the carrier surface is dissolved in a new solvent (containing no solute). The component is immobilized on an inert carrier again and then introduced into the apparatus.

When one kind of a specific component is to be extracted for a complex sample, it is often difficult to adsorb only the specific component in one process. In such a case, it is effective to perform a set of selective immobilization to the carrier surface and dissolution of the component a plurality of number of times while sequentially narrowing down the selection target.

EXAMPLE 1

A detailed example of use of the mass spectrometer according to the embodiment will be explained below.

As the mass spectrometer, that shown in FIGS. 1, 2, and 3 was used. As a sample, microcrystalline sucrose was ground to a particle size of not less than 1 micrometer and not greater than 10 micrometer using a mortar and a pestle. 0.1 to 0.2 mg of the ground sucrose was introduced into the ionization chamber 11. The mesh 31 was designed to inhibit fine particles exceeding the particle size from entering the ionization chamber 11. The measurement conditions were primary ions: $Li^+$, ionization chamber temperature: about 300° C., ionization chamber pressure: about 40 Pa ($N_2$), and measurement cycle time: 150 msec/scan.

Figure 7:
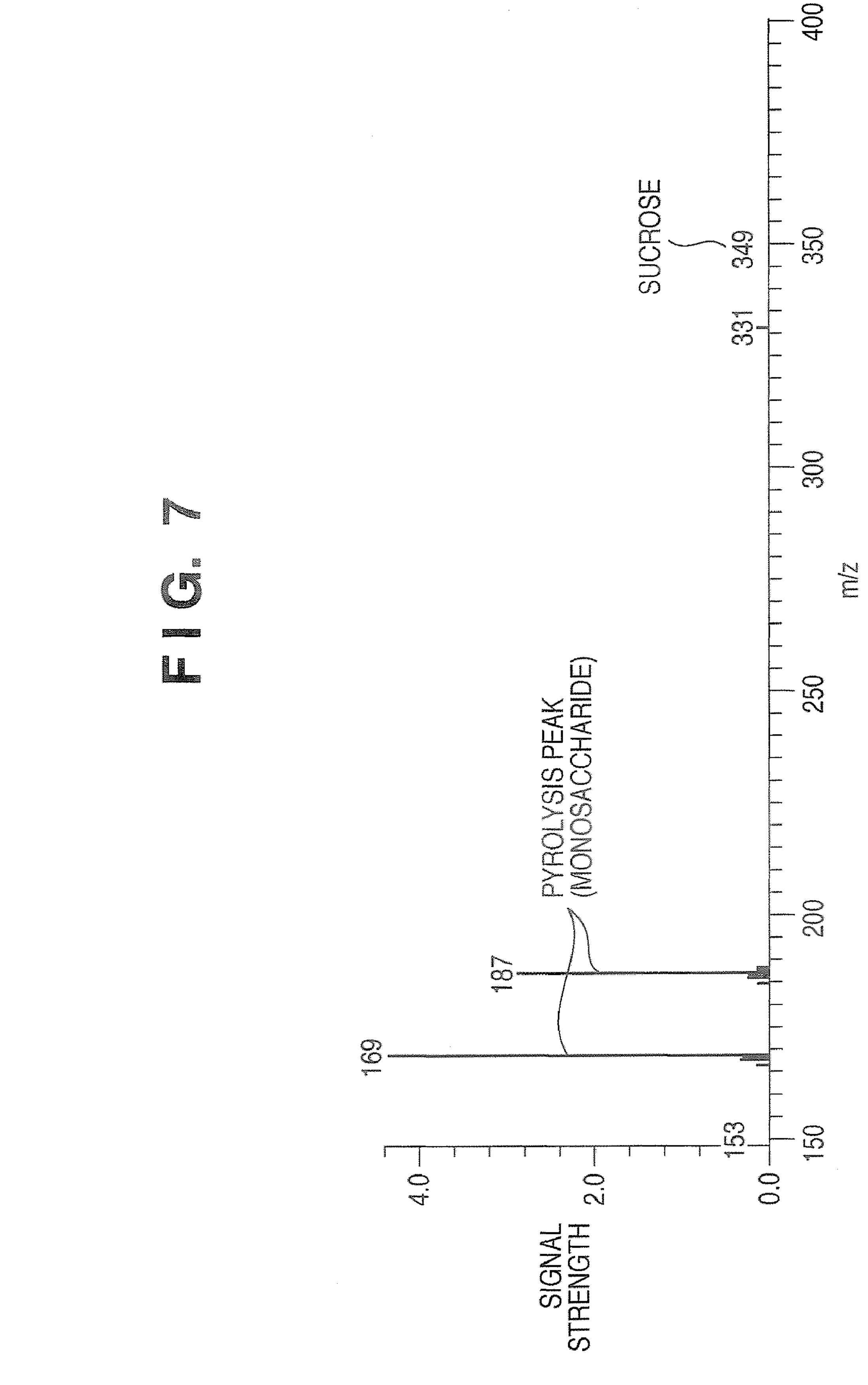
FIG. 7 is a graph showing the IA mass spectrum of sucrose measured by a conventional sample holder heating method.
Figure 8:
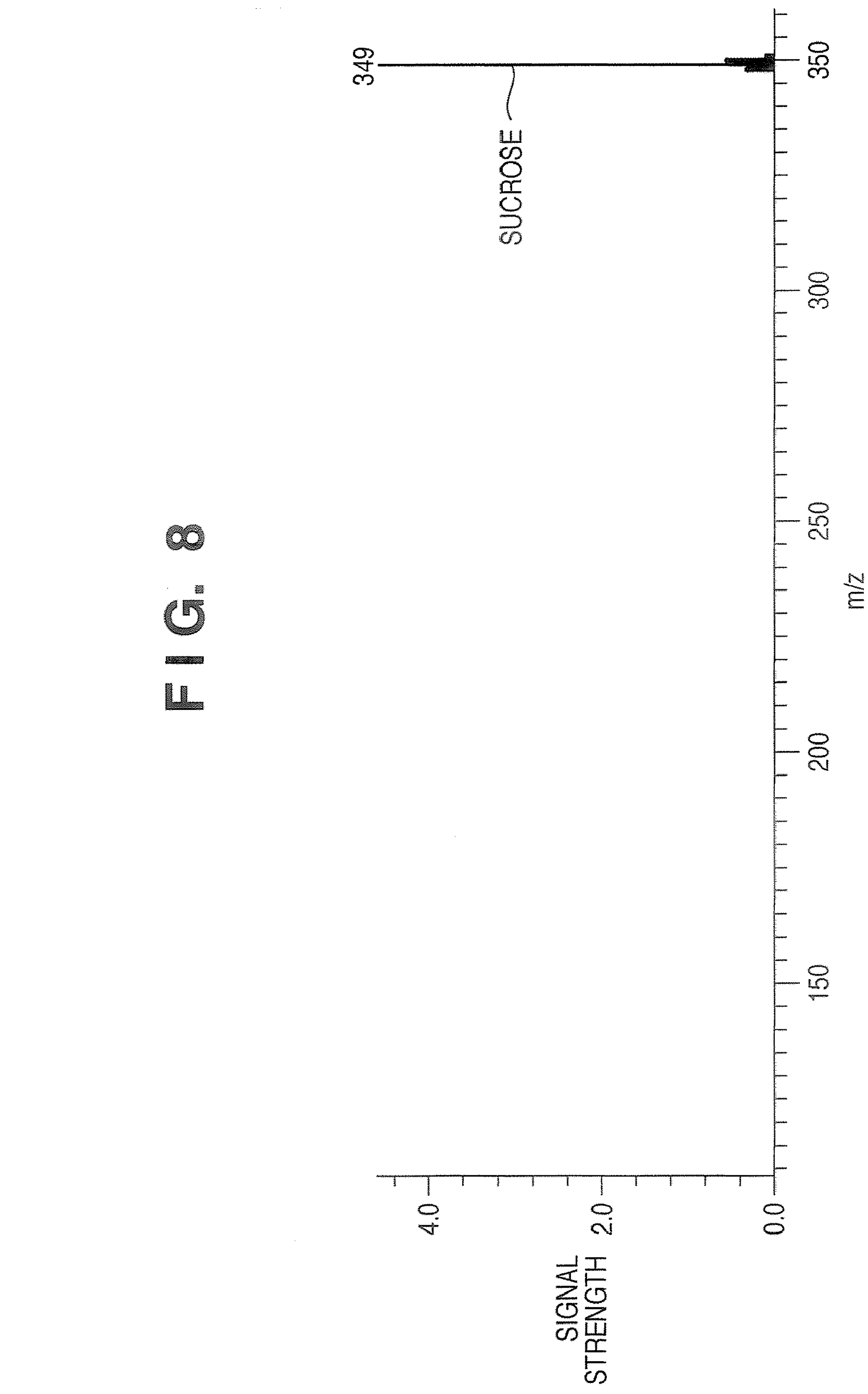
FIG. 8 is a graph showing the IA mass spectrum of sucrose measured using the mass spectrometer according to the first embodiment.
Figure 9:
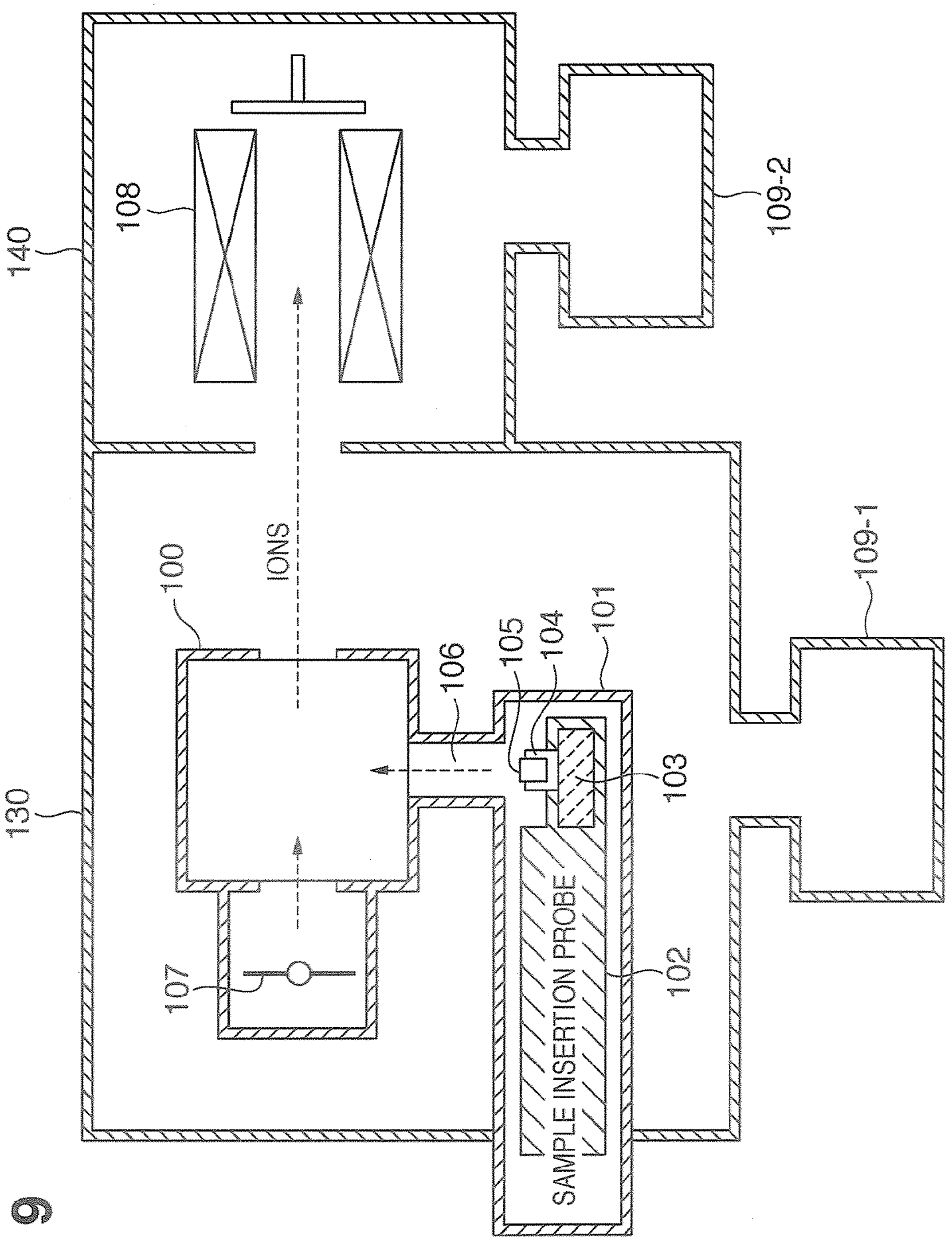
FIG. 9 is a view showing an example of the arrangement of a mass spectrometer for a solid or liquid sample.
Figure 10:
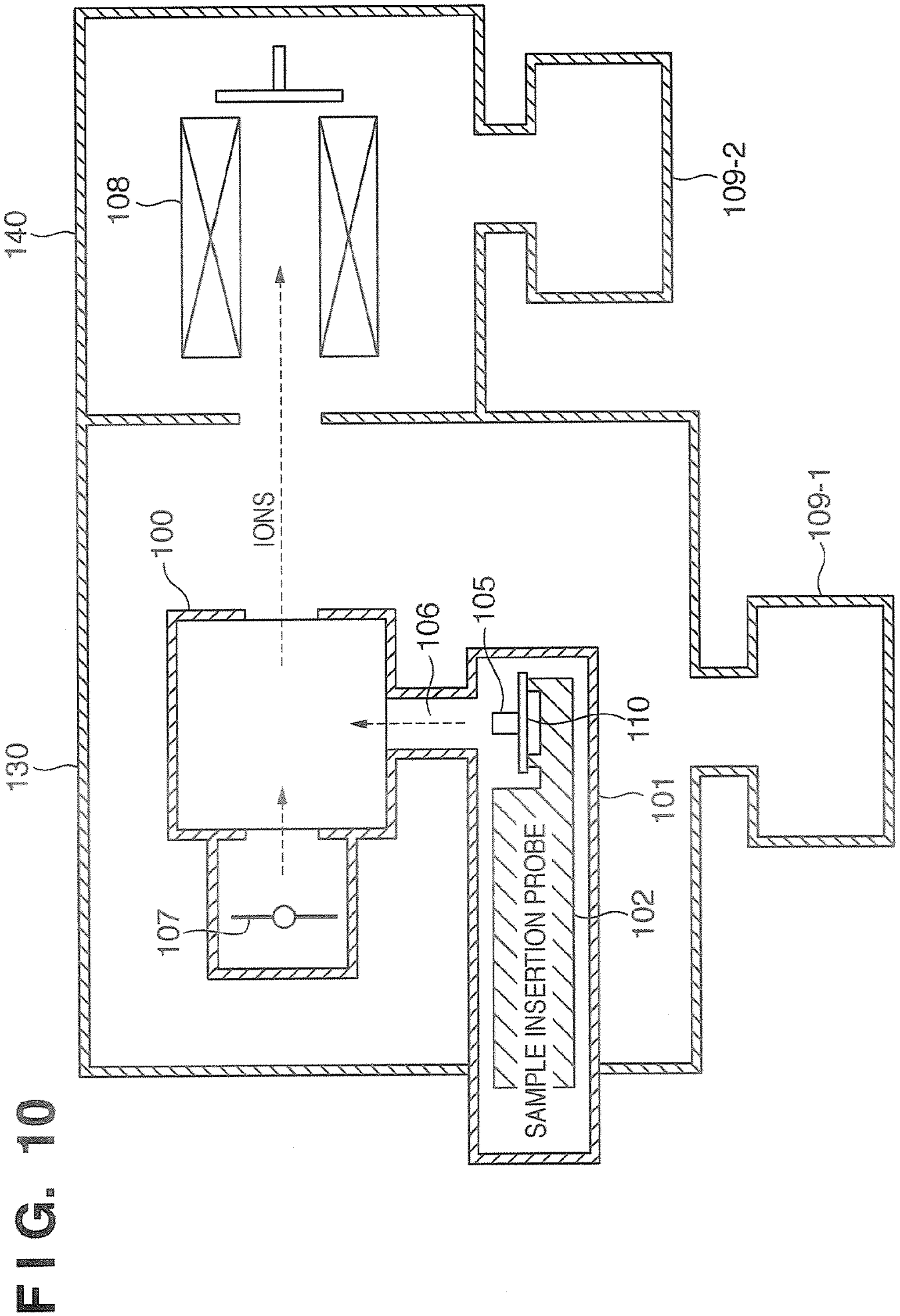
FIG. 10 is a view showing another example of the arrangement of the mass spectrometer for a solid or liquid sample.

FIG. 7 is a graph showing the mass spectrum (to be referred to as an IA mass spectrum hereinafter) of sucrose measured by an ion attachment mass spectrometer using a conventional sample holder heating method. FIG. 8 is a graph showing the IA mass spectrum of sucrose measured using the mass spectrometer according to the first embodiment of the present invention. The sucrose as a polysaccharide easy to pyrolytically decompose vigorously pyrolytically decomposed in the conventional DIP (FIG. 7). However, a result free from pyrolysis was obtained by the mass spectrometer of the embodiment (FIG. 8).

Sucrose was exemplified here as a sample. For any other samples, settings can be done based on the conditions of the sucrose. However, the temperature in the ionization chamber may be changed as needed because it is preferably set to be slightly higher than the vaporization temperature of the target measurement sample. More specifically, the temperature is set at 300° C. or more for a sample hard to vaporize, or at a temperature lower than 300° C. for a component easy to pyrolytically decompose.

In the example of sucrose, the sample itself is the target measurement component. If a target measurement sample is contained in a base material only at a small ratio, the sample amount to be introduced is preferably increased almost in inverse proportion to the ratio. More specifically, the sample amount to be introduced is adjusted such that the amount of the target measurement component becomes about 0.1 mg. This enables measurement at a sufficient S/N ratio (signal-to-noise ratio).

The smaller the particle size is, the higher the rate of temperature rise is. As the rate of temperature rise increases, decomposition (pyrolysis) is more difficult to occur. Hence, a sample easy to decompose is preferably made as fine as possible. That is, the necessary particle size depends on ease of decomposition of the target measurement component, and is actually decided based on the decomposability of the component and the time and labor of fine grinding.

Even when a carrier is used, the same measurement conditions as described above can be used.

As a method of ionizing a sample while suppressing decomposition using the present invention, the already described ion attachment method is preferable. Alternatively, PTR (Proton Transfer Reaction, http://www.ptrms.com/index.html) using $H^+$ (protons) transfer from $H_3O$ ions, and IMS (Ion Molecule Spectrometer, http://www.vandf.com/) using charge exchange from, for example, mercury ions are also usable.

As the ions to be used in the ion attachment method, $Li^+$ is used. However, the present invention is not limited to this, and is applicable to, for example, $K^+$, $Na^+$, $Rb^+$, $Cs^+$, $Al^+$, $Ga^+$, and $In^+$. As the mass analyzer, a variety of mass spectrometers such as a Q-pole mass spectrometer (QMS), ion trap (IT) mass spectrometer, magnetic sector (MS) mass spectrometer, time-of-flight (TOF) mass spectrometer, and ion cyclotron resonance (ICR) mass spectrometer are usable.

As the overall structure, a two-chamber structure including a first cell with an ionization chamber and a second cell with a mass analyzer has been exemplified. However, the present invention is not limited to this. In the ionization method while suppressing decomposition, the pressure outside the ionization chamber is 0.01 to 0.1 Pa. A one-chamber structure is possible for a mass spectrometer capable of operating at this pressure. For a mass spectrometer that requires a much lower pressure, a three- or four-chamber structure is necessary. Generally, it is supposed to be appropriate to use a one-chamber structure for a microminiaturized QMS or IT, a two-chamber structure for a normal QMS or MS, a three-chamber structure for a TOF, and a four-chamber structure for an ICR.

According to the preferred embodiment of the present invention, for example, it is possible to quickly, accurately, simply, and inexpensively measure the mass of a solid or liquid sample without decomposing its atomic group regardless of components and the presence/absence of a solvent.

The present invention is suitable used for a mass spectrometer which performs measurement using a method of ionizing a solid or liquid sample easy to pyrolytically decompose while suppressing decomposition and, more particularly, to a mass spectrometer using an ion attachment method for ionization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119042, filed Apr. 30, 2008, which is hereby incorporated by reference herein in its entirety.

What is claimed is:

1. A mass spectrometer comprising:

an ionization chamber;

a temperature control unit configured to control a temperature in the ionization chamber to vaporize a sample in at least one of a solid state and the liquid state in the ionization chamber;

an introduction unit configured to introduce the sample using gravitation in at least one of the solid state and the liquid state into the ionization chamber;

an ion supply unit configured to supply metal ions to the ionization chamber to ionize, in the ionization chamber, the sample vaporized in the ionization chamber; and a mass analyzer configured to measure a mass of molecules of the ionized sample.

2. The spectrometer according to claim 1, wherein the sample is vaporized and ionized in a vaporization region in the ionization chamber.

3. The spectrometer according to claim 2, wherein the vaporization region is a central region of the ionization chamber.

4. The spectrometer according to claim 1, wherein the sample in at least one of the solid state and the liquid state introduced into the ionization chamber has a particle size that is not less than 1 micrometer and not greater than 10 micro meter.

5. The spectrometer according to claim 1, further comprising a first cell and a second cell which are evacuated by an exhaust unit, wherein the second cell is connected to the first cell via an aperture, and the ionization chamber is provided in the first cell, and the mass analyzer is provided in the second cell.

6. The spectrometer according to claim 1, wherein the sample is introduced into the ionization chamber as fine particles.

7. The spectrometer according to claim 1, wherein the sample is immobilized on a surface of a particulate carrier and introduced into the ionization chamber.

8. The spectrometer according to claim 1, wherein the ionization chamber has an outlet.

9. The spectrometer according to claim 1, wherein the temperature control unit includes a heater.

10. The spectrometer according to claim 1, further comprising:

a holder which holds the sample;

a mechanism which drops the sample held by the holder; and a focusing structure arranged between the holder and the ionization chamber, wherein the focusing structure is configured to focus the sample to be supplied to the ionization chamber.

11. The spectrometer according to claim 10, further comprising a vibrator configured to vibrate the holder.

12. The spectrometer according to claim 1, wherein the ion supply unit comprises an emitter configured to emit metal ions when heated, and the molecules of the vaporized sample are ionized by the metal ions that enter the ionization chamber from the emitter and attach to the molecules.

13. A mass spectrometry method comprising the steps of:

controlling a temperature in an ionization chamber to vaporize a sample in at least one of a solid state and a liquid state in the ionization chamber;

introducing the sample into the ionization chamber using gravitation;

ionizing the sample with metal ions, in the ionization chamber, the sample being vaporized in the ionization chamber; and measuring a mass of molecules of the ionized sample.

* * * * *